United States Patent [19]

Kiernan et al.

[11] Patent Number: 4,723,656

[45] Date of Patent: Feb. 9, 1988

[54] BATTERY PACKAGE WITH BATTERY CONDITION INDICATOR MEANS

[75] Inventors: Charles E. Kiernan, Westport; Robert L. Milanese, Brookfield, both of Conn.

[73] Assignee: Duracell Inc., Bethel, Conn.

[21] Appl. No.: 58,059

[22] Filed: Jun. 4, 1987

[51] Int. Cl.⁴ ............................................ B65D 65/02
[52] U.S. Cl. .................... 206/333; 206/459; 429/100; 429/99; 429/176
[58] Field of Search ............ 429/99, 96, 100, 163, 429/176; 206/333, 459

[56] References Cited

U.S. PATENT DOCUMENTS 3,990,578  11/1976  Roeser ................................. 206/333
4,130,200  12/1978  Iepson et al. ....................... 206/333
4,166,532   9/1979  Tsuchida et al. ................... 206/333
4,205,121   5/1980  Naitoh ................................. 206/333

*Primary Examiner*—Joseph Man-Fu Moy
*Attorney, Agent, or Firm*—Ronald S. Cornell; James B. McVeigh

[57] ABSTRACT

The present invention is a package for the sale and display of batteries having a voltage indicator integrally associated with the package. A pair of electrical contacts are associated with the voltage indicator and the contacts are so positioned on the package that they are accessible for alignment with the terminals of a battery placed therebetween. When the electrical contacts make simultaneous connection to the terminals of a battery, current flows through the voltage indicator to visually indicate the magnitude of the voltage of the battery.

14 Claims, 6 Drawing Figures

BATTERY PACKAGE WITH BATTERY CONDITION INDICATOR MEANS

This invention is directed to a package for the sale and display of batteries having a voltage indicator supplied integrally therewith. Such a combination allows the consumer to readily test the "freshness" of batteries upon purchase as well as after extended periods of use or non-use. While the voltage indicator remains integral with the package, it is easily contacted to the terminals of a battery to give a visual indication of the battery's voltage.

The voltage indicator contemplated herein comprises a material which indicates an applied voltage by undergoing a physical change. The properties of the material are such that this physical change is accompanied by a change in color. Therefore when the voltage indicator is connected across the positive and negative terminals of a battery there is a color change which corresponds to the voltage of the battery. Thus there is provided for the consumer a visually discernable change which gives an indication of the condition of the battery tested.

The material contemplated for use in this invention is a liquid crystal preferably of the chiral nematic type. Suitable materials can be either electrochromic, meaning that the color changes in response to an electric field gradient or thermochromic, meaning that the color changes in response to a temperature change.

Liquid crystal materials have been used in the past as a means for indicating voltage or current. U.S. Pat. No. 3,667,039 discloses a device which has a liquid crystal material contained within a rigid housing. One embodiment measures voltage by establishing an electric field gradient across the liquid measures voltage by establishing an electric field gradient across the liquid crystal material. Another embodiment measures current by detecting a change in temperature. These designs are far more complicated in construction than the design of the present invention and would be too costly to incorporate into a package used in commercially marketing batteries.

U.S. Pat. No. 4,006,414 discloses a voltage or current indicating device which is simply constructed and whose principal of operation is of a type suitable for use in this invention. While this invention is principally directed to a current indicator which provides an irreversible indication of the magnitude of current it also discloses that it could be made reversible by using a liquid crystal material.

It is known to mount a voltage indicating device on a flexible transparent substrate. The resistive element through which current passes when connected to the terminals of a battery is bow-tie shaped and is mounted on one side of the flexible substrate. The liquid crystal material is deposited on the substrate side opposite to the bow-tie shaped element so as to be coincident therewith. The flexible character of the substrate permits it to be bent around a variety of cylindrical battery sizes in order to contact terminals located on opposite ends of the battery. When connected across the terminals of a battery, current passes through the bow-tie shaped element thereby heating up the narrow section of the bow-tie first. The temperature gradient proceeds outwardly from the narrow section along the two arms of the bow tie. The corresponding color change of the liquid crystal material begins at the center of the bow-tie and moves outwardly for a distance corresponding to the voltage of the battery. The disadvantage of this device is that it is made to accommodate all battery sizes, and therefore it can be awkward to handle when testing small batteries because it's size must also be able to accommodate large batteries. This can make it difficult to align the contacts to the terminals of a small battery.

It is an object of the present invention to provide a package for the sale and display of batteries wherein a voltage indicator means is integrally associated with the package.

It is a further object of the present invention to incorporate a voltage indicator into the blister portion of a blister card package containing batteries.

It is an additional object to provide a reversible voltage indicating means which is capable of displaying an indication of the state of charge or service hours remaining in the battery.

It is an additional object to have the contact points of the voltage indicator conveniently located on the blister so that a battery is easily positioned with its terminals coincident with the contact points.

It is an additional object to have the voltage indicating means integral with the inside surface of the blister so that the voltage of a battery can be determined while being held within the blister.

It is an additional object to have a voltage indicating means integral with a blister so that the voltage of batteries can be tested without removing them from the blister card package.

The objects, features, and advantages of the invention will become clear from the following discussion and drawings in which.

The present invention relates generally to a package for the sale and display of batteries wherein a voltage indicator is integrally associated with the package. The package comprises a holding means for one or more batteries and voltage indicator means including a pair of electrical contacts integrally associated with the package means. The contacts are so positioned with respect to the packaging means that they are accessible for alignment with the terminals of a battery placed therebetween. When the contacts are connected to the terminals of a battery, current flows through the voltage indicator to visually indicate the magnitude of the voltage of the battery.

The voltage indicator is designed to indicate the battery condition. As discussed below, the voltage indicator can indicate the state of charge of the battery or the relative amount of service hours remaining in the battery. As such the voltage indicator simulates an actual device which uses that particular battery size.

The voltage indicator means preferably comprises a liquid crystal material and a resistive element, wherein the liquid crystal material is in thermal contact with a resistive element. The resistive element is connected to the pair of electrical contacts. When the current flows through the resistive element heat is generated in an amount proportional to the voltage of the battery. The heat is transferred to the liquid crystal material which responds by undergoing a color change also in proportion to the heat transferred, thus giving a visual indication of the voltage of the battery.

In a preferred embodiment of the present invention wherein the package comprises a backing member and a blister bubble member attached thereto adapted to hold at least one battery therebetween and wherein a voltage indicating strip is associated with the blister bubble, the voltage indicating strip comprises a liquid crystal layer so positioned as to be capable of being viewed from the outside of the package. The electrical contacts for the voltage indicating strip are positioned on the inside surface of said bubble member that they are accessible for alignment with the terminals of a battery placed therebetween.

Figure 1:
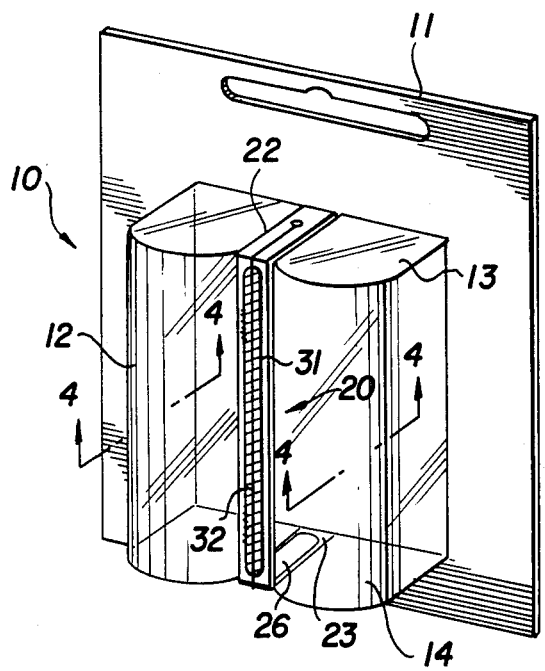
FIG. 1 shows a blister card package for holding batteries having a voltage indicating strip integrally associated with the blister portion of the blister card package.

Referring now to the drawings, FIG. 1 shows a blister card package 10 for the sale and display of batteries having voltage indicating means 20 integral with the package. The blister card package is comprised of a backing member 11 and a bubble member 12. The backing member 11 can be made of any rigid material such as cardboard or plastic. Since it is desirable to locate the voltage indicating strip 20 on the inside surface of the bubble member 12 the bubble member is preferably made of a transparent material. Preferred materials include transparent plastics, such as polyvinylchloride or modified polyvinylchloride, which are rigid and have a mechanical strength sufficient to contain batteries.

The bubble member 12 has a shape which closely conforms to the shape of the batteries being held so that the batteries are firmly held and relatively immobile. As a result, the upper surface 13 and the lower surface 14 of the bubble 12 are separated by a distance approximately equal to the height of the batteries being held. When the batteries are of the cylindrical type the upper surface 13 and the lower surface 14 directly oppose the positive and negative terminals, respectively, of the batteries. Therefore by locating the electrical contacts of the voltage indicating strip on the inside surfaces 13 and 14 the contacts are accessible for alignment with the terminals of a battery placed therebetween.

Figure 2:
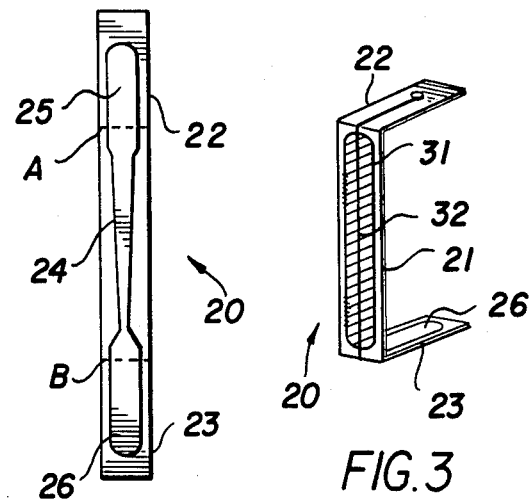
FIG. 2 shows a voltage indicating strip viewed from the back before it is fixed to the inside surface of the blister.
Figure 3:
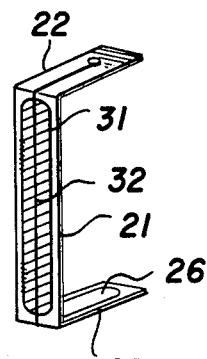
FIG. 3 shows a voltage indicating strip viewed from the front and having the contact portions bent prior to being fixed to the inside surface of the blister.

Referring now to FIGS. 2 and 3, the voltage indicating strip 20 is comprised of a substrate having a middle portion 21, a first end portion 22, and a second end portion 23. The strip can be made of stiffened paper, plastic, cardboard or the like. The substrate should not be electrically conductive and it should not have an appreciable thermal mass so that heat can readily be transferred through it. The voltage indicator strip further comprises an electrically resistive element 24 located on one side of the middle portion 21, a first electrical contact 25 connected to element 24 on the first end portion 22 of the strip 20, a second electrical contact 26 is connected to element 24 on the second end portion 23 of the strip 20. The strip also includes a liquid crystal layer 31, coated on the side of the middle portion 21 of the strip 20 opposite to the side having the resistive element whereby said liquid crystal layer 31 is in thermal contact with said electrically resistive element 24.

In FIG. 3 shows the strip 20 is shown folded along lines A and B (FIG. 2) so that the strip conforms to the inner surface of the blister bubble 12. FIG. 3 shows a battery condition scale 32 printed on the strip. A coating of a liquid crystal material 31 is applied over the indication sale 32. When current flows through resistive element 24 it heats up and this heat passes to the liquid crystal material 31 which indicates battery condition by color change. In one embodiment, the liquid crystal material can be transparent when at room temperature but becomes an opaque color when heated.

The liquid crystal material is preferred to be of the thermochromic type. Of the three types of liquid crystals, chiral nematic, smectic, and cholesteric, chiral nematic is the most preferred. The liquid crystal materials disclosed in U.S. Pat. Nos. 4,077,260; 4,149,413; 4,195,916; and 4,257,911 are incorporated herein by reference and made a part hereof, as being suitable for use in the subject invention.

Cholesteric liquid crystal materials which are suitable for use in the subject invention include but are not limited to cholesteryl chloride, cholesteryl oleyl carbonate, cholesteryl bromide, cholesteryl acetate, cholesteryl nanoate, cholesteryl oleate, cholesteryl caprylate, and the like.

Most liquid crystals are colorless as liquids and reversibly exhibit iridescent color effects at various temperatures throughout the transition from one phase to another. Some liquid crystals show only a few colors and not the entire spectrum during this transition. The color versus temperature effect is a reproducible phenomenon. Since liquid crystals and liquid crystal mixtures possess the unique quality of being able to indicate temperatures, they are useful for the measurement of surface temperatures. In the present invention the liquid crystals are used to detect the surface temperature of the resistive element 24.

A suitable liquid crystal material is made by BDH Co, England. The product is designated TM 255. It is an aqueous dispersion wherein the liquid crystal material is microencapsulated. TM 255 is a mixture of liquid crystal materials of the following general formula:

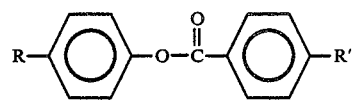

wherein R is preferably 2-methylbutyl, R' is —O—R" or

and R" is a straight or branched alkyl chain having 3 to 15 carbon atoms. Liquid crystal materials wherein R is a straight or branched alkyl chain other than 2-methylbutyl would also be operable in the present invention. The temperature at which a color change begins is about 43° C. The layer optimally has a thickness of about 0.001 or 0.002 inch. The liquid crystal need only be applied on the middle section 21 of the substrate between folds A and B in FIG. 2.

The resistive element 24 is designed so that a temperature gradient develops longitudinally along its surface wherein the gradient is dependent upon the voltage of a battery being tested. The resistive element 24 as well as the contacts 25 and 26 are comprised of a material that is deposited on the substrate by printing, coating, painting or other conventional depositing techniques. This material may be epoxy or urethane based silver, nickel, or carbon and may be in the form of a conductive "ink". Silver is the preferred conductor. A suitable epoxy based silver is the brand name Electrodag 473SS made by Acheson Colloid Co. Port Huron, Mich. The layer is preferably 0.001" thick. The resistive element 24 is designed so that it has an increasing cross sectional area in a longitudinal direction from one end to the other. A preferred way to accomplish this is to have element 24 wedge shaped as shown in FIG. 2. The electrical contacts and resistive element are designed to have an electrical resistance which is comparable to the resistance of an actual device which would use the battery size being tested. For example a device using a D size cell would have a resistance between 2-4 ohms while a device using a C size or AA size would have a resistance between 3-6 ohms. By using these resistances for these cell sizes the battery condition indicator is capable of measuring the state of charge or service hours remaining in the battery. The current which flows through the element when testing a battery is directly proportional to the voltage because the element 24 has a fixed resistance. When the element 24 is wedge shaped the current causes the narrow end to heat up first.

It is preferred that the voltage indicator of the present invention is attached to the blister bubble so that the narrow end of the wedge is located close to the bottom end 14 of the blister bubble 12 while the wider end of the wedge is located close to the top end 13 of the blister bubble. As viewed from the front, a battery condition scale indicates at the narrow end of element 24 and at the wider end of element 24 is located.

In operation, a battery is place between contacts 25 and 26; current flows through wedge shaped element 24; the narrow end of the wedge heats up first and a color change appears. The color change then travels up the indicator scale as the wider sections of the wedge heat up and this heat is transferred to the liquid crystal material. If the battery is fully charged the color change proceeds all the way to the top of the scale. If the battery charge is low the current will be low and a color change only proceeds part way up the scale. Thus, there is provided a voltage indicator integral with the blister portion of a blister card package which allows the consumer to determine the freshness of a battery.

It is also desirable to apply a protective covering over the resistive element 24 so that it does not get damaged. The coating should be non-conductive. It can be a material such as a UV curing paint or it could be a thin layer of adhesive tape or the like. As with the nature of the substrate material, the coating should not have an appreciable thermal mass so that the heat generated by the resistive element is readily transferred to the liquid crystal material.

Figure 4:
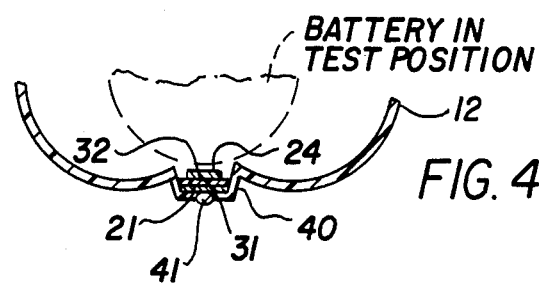
FIG. 4 shows a cross sectional view through the bubble portion of the blister card package shown if FIG. 1.

FIG. 4 shows a cross sectional view of a blister bubble. The bubble 12 is formed so that it has an outwardly projecting portion 40. The inside surface accommodates the voltage indicator strip. It projects outwardly so that a battery held in test position will not touch the resistive element 24. This prevents the battery from acting as a heat sink for the resistive element which would prevent heat transfer to the liquid crystal. The voltage indicator strip is attached so that the liquid crystal layer 31 faces outward. It is highly preferred, for proper color indication, that a portion of the blister bubble 41 across from the liquid crystal material be raised away from the liquid crystal material whereby heat is not transferred away from the liquid crystal. A dramatic color effect can be provided if only the portion of blister bubble 41 directly across from the indicator 32 is raised so that only the liquid crystal directly on top of the indicator scale changes color with sharp lines of demarcation.

It is also preferred that the portion of the top surface 13 of the blister bubble 12 which is the location of the end portion 22 of the voltage indicator strip be formed so that it outwardly protrudes from the rest of the surface of 13. As viewed from the inside of the bubble this portion would be recessed so as to form a channel with the electrical contact being along the bottom of the channel. It is preferred that the depth of the channel is slight greater than the height of a protruding positive terminal of a battery. This aids the voltage measurement by having the positive terminal engaged with the channel in order to contact electrical contact 25. This engagement holds the battery in position for easy alignment with the electrical contacts. Once the battery is in this position a slight pressure can be applied to the contacts using the thumb and forefinger to make electrical connection to the battery terminals.

The complete voltage indicator strip is applied to the inside surface of the bubble portion where it projects outwardly. The strip is specifically located so that the middle portion of the substrate (the portion between folds A and B) is against the longitudinal middle portion of the front face of the blister bubble. The electrical contacts are positioned on opposite sides of the inside surface of the blister bubble as shown in FIG. 1 which may be outwardly deformed as described above. The strip is attached so that the narrow end of the resistive element is close to the bottom of the package which is associated with the negative terminals of the batteries to be held. An adhesive can be used to hold the voltage indicating strip to the inside surface of the bubble.

The resulting blister card package has a voltage indicating strip integral with the bubble portion. Electrical contacts are so positioned on the inside surface that the cylindrical battery can readily be placed therebetween to make electrical contact. While holding the battery between the contacts the indicator is viewed from the front and a color change is observed in the liquid crystal material which together with the scale provides a reading of the battery's voltage.

While a package with voltage indicator is described above for a D size cell it will be readily apparent to one skilled in the art how to modify this design for other cell sizes using the same or similar materials. Resistive elements having other resistances are made by an appropriate change in the amount of epoxy based silver used. Therefore, since a C size or AA size cell are intended by the manufacturer for a high rate discharge at about 4 ohms, this would be the desirable resistance of the resistive element in a voltage indicator for these cells. It would also be readily apparent for one skilled in the art how to use this invention for non-cylindrical batteries, such as an alkaline 9 V battery or lithium 6 V 223 A battery. Therefore, this invention has universal application for batteries of all sizes and voltages which are contained in a package for sale and display.

Figure 5:
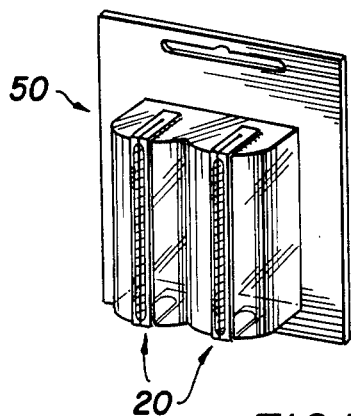
FIG. 5 shows an alternate embodiment having multiple voltage indicators.

The battery package embodiment described above requires the package to be opened and the batteries relocated before testing. However, alternate embodiments of the present invention would allow testing before purchase while the batteries are still contained within the package. One such embodiment is shown in FIG. 5. It uses as many voltage indicator strips 20 as there are cells contained in the package 50. Each strip is fixed to the inside surface of the bubble member such that its contacts are opposed to the terminals of one battery and the liquid crystal material is visible through the bubble member.

Figure 6:
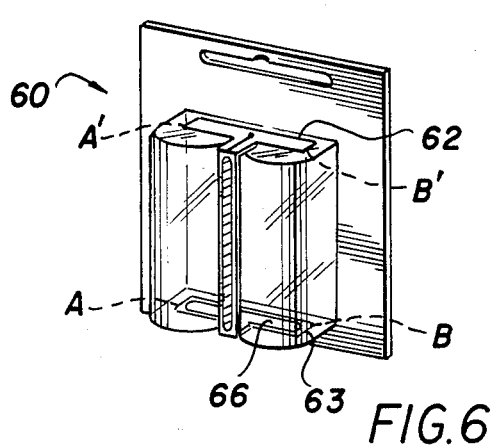
FIG. 6 shows an alternate embodiment having multiple electrical contacts for a single voltage indicator.

Another embodiment is shown in FIG. 6. It uses a single voltage indicator 60 but with "T" shaped end portions 62 and 63 which accommodate "T" shaped electrical contacts. The strip is fixed to the inside surface of the bubble member such that the T shaped contacts are located on opposite sides of the inside surface of the bubble member and the liquid crystal material is visible through the bubble member. Each T shaped contact extends out in opposite directions perpendicular to the strip so as to be disposed over the terminals of each battery being held. Squeezing one end of each T shaped contact onto opposite terminals of the same battery causes current to flow through the resistive element generating heat therein proportional to the voltage of the battery. The heat is transferred to the liquid crystal material to give a visual indication of the voltage of the battery.

In the above two embodiments the voltages of each battery can be independently tested while remaining in their original positions in the package. In both cases the contacts, being directly opposed to battery terminals, would have to be recessed away from the terminals so that the batteries could not short out by casual contact during shipping.

The liquid crystal materials discussed so far change color in response to temperature. Materials which respond to temperature by turning from opaque to transparent are also useful. These would be equally suitable for use in the present invention. If this type of liquid crystal material were used, the battery condition scale would initially not be visible. When a battery is tested the liquid crystal would turn transparent and the battery condition scale would be revealed to an extent corresponding to the voltage of the battery.

The above description is for illustration and explanation purposes and should not be interpreted to impose any limitations on the invention as claimed. Variations can be made by one with ordinary skill in the art and still remain within the scope of the claimed invention.

What is claimed is:

1. A package for the sale and display of batteries having a voltage indicator integrally associated with the package comprising a holding means for one or more batteries, a voltage indicator means including a pair of electrical contacts integrally associated with the package means; wherein said contacts are so positioned with respect to the package means that they are accessible for alignment with the terminals of a battery placed therebetween; whereby when the electrical contacts make simultaneous connection to the terminals of a battery, current will flow through the voltage indicator means to visually indicate the magnitude of the voltage of the battery.

2. The package of claim 1 wherein the voltage indicator means indicates the state of charge of the battery when the pair of electrical contacts make simultaneous connection to the terminals of the battery.

3. The package of claim 1 wherein the voltage indicator means indicates the service hours remaining in the battery when the pair of electrical contacts make simultaneous connection to the terminals of the battery.

4. The package of claim 2 wherein the voltage indicator means comprises a liquid crystal material.

5. The package of claim 4 wherein the voltage indicator means further comprises a resistive element wherein the liquid crystal material is in thermal contact with the resistive element; and said resistive element is connected to the pair of electrical contacts; whereby when the electrical contacts make simultaneous connection to the terminals of a battery current flow through the resistive element generating heat therein proportional to the voltage of the battery; and said heat is transferred to said liquid crystal material which responds by undergoing a color change thus giving a visual indication of the voltage of the battery.

6. The package of claim 5 wherein the liquid crystal material is comprised of a thermochromic chiral nematic type.

7. A blister card package for the sale and display of batteries having voltage indicating means integral with the package comprising a backing member and a bubble member attached thereto and adapted to hold at least one battery therebetween, at least one voltage indicating strip integrally associated with the bubble member, said voltage indicating strip comprising a liquid crystal layer so positioned as to be capable of being viewed from the outside of the package, and a pair of electrical contacts for the voltage indicating strip being so positioned on the inside surface of the bubble member that they are accessible for alignment with the terminals of a battery place therebetween; whereby when the electrical contacts make simultaneous connection to the terminals of a battery, current will flow through the voltage indicating strip to visually indicate the magnitude of the voltage of the battery.

8. The package of claim 7 wherein the voltage indicating strip is comprised of a substrate having a middle portion, a first end portion and a second end portion; and a resistive element located on one side of the middle portion and connected to the pair of electrical contacts wherein one electrical contact is located on each end portion; wherein the length of the strip is sufficient for the contact on the first end portion to connect to one terminal of a battery while the contact on the second end portion connects to the other terminal of the battery; and wherein the liquid crystal layer is in thermal contact with the resistive element.

9. The package of claim 8 wherein the liquid crystal layer is comprised of a thermochromic chiral nematic liquid crystal material coated on the side of the middle portion of the strip opposite to the side having the resistive element and the side of the strip having the liquid crystal material is the side which is attached against the inside surface of the bubble member.

10. The package of claim 9 wherein a battery condition scale is imprinted on the side of the strip opposite to the side having the resistive element and said liquid crystal material is applied in a layer over said scale.

11. The package of claim 10 wherein the portion of the bubble member coincident with the voltage indicating scale is raised away from the liquid crystal material so as to prevent the transfer of heat to the bubble member portion coincident with said scale.

12. The package of claim 11 wherein the resistive element is a wedge shaped deposit of epoxy based silver.

13. A blister card package for the sale and display of batteries having voltage indicating means integral with the package comprising a backing member and a transparent bubble member attached thereto and adapted to hold therebetween two or more batteries side by side; two or more voltage indicating strips integrally associated with the inside surface of the bubble member; each strip being comprised of a liquid crystal material, a resistive element, and a pair of electrical contacts wherein the liquid crystal material is in thermal contact with the resistive element and the electrical contacts are connected to opposite ends of the resistive element; and wherein each strip is fixed to the inside surface of the bubble member such that the contacts of each strip are opposed to the terminals of one battery and the liquid crystal material is visible through the bubble member.

14. A blister card package for the sale and display of batteries having voltage indicating means integral with the package comprising a backing member and a bubble member attached thereto and adapted to hold therebetween two cylindrical batteries side by side; a voltage indicating strip integrally associated with the inside surface of the bubble member; said strip being comprised of a liquid crystal material, a resistive element, and a pair of T shaped electrical contacts, wherein the liquid crystal material is in thermal contact with the resistive element and the electrical contacts are connected to opposite ends of the resistive element; and wherein the strip is fixed to the inside surface of the bubble member such that the T shaped contacts are located on opposite sides of the inside surface of the bubble member such that each T shaped contact extends out in opposite directions perpendicular to the strip so as to be disposed over the terminals of each battery being held and the liquid crystal material is visible through the bubble member.

* * * * *